United States Patent [19]

Miyabayashi

[11] Patent Number: 4,871,582
[45] Date of Patent: Oct. 3, 1989

[54] METHOD OF MANUFACTURING MAGNETIC RECORDING MEDIUM

[75] Inventor: Takeshi Miyabayashi, Nagoya, Japan

[73] Assignee: Brother Kogyo Kabushiki Kaisha, Nagoya, Japan

[21] Appl. No.: 87,633

[22] Filed: Aug. 20, 1987

[30] Foreign Application Priority Data

Sep. 12, 1986 [JP] Japan .................................. 61-216804

[51] Int. Cl.$^4$ .............................................. B05D 3/06
[52] U.S. Cl. .................................... 427/53.1; 427/130; 427/132; 427/287; 427/438; 428/694; 428/900
[58] Field of Search ...................... 427/287, 283, 53.1, 427/48, 128, 130, 132, 438; 428/900, 694

[56] References Cited

U.S. PATENT DOCUMENTS

| 3,873,341 | 3/1975 | Janus | 427/53.1 |
| 3,892,888 | 7/1975 | Halaby | 117/127 |
| 4,451,500 | 5/1984 | Gerard et al. | 427/53.1 |
| 4,748,045 | 5/1988 | Ehrlich et al. | 427/53.1 |

Primary Examiner—Bernard D. Pianalto
Attorney, Agent, or Firm—Kane, Dalsimer, Sullivan, Kurucz, Levy, Eisele and Richard

[57] ABSTRACT

Disclosed is a method of manufacturing a magnetic recording medium which comprises the steps of: forming a non-magnetic layer on a substrate by using a non-magnetic material which is magnetizable by heat to a predetermined temperature, and then locally heating the non-magnetic layer to magnetize the heated part to thereby form a magnetic layer thereat.

6 Claims, 4 Drawing Sheets

FIG.1(a) FIG.1(b)
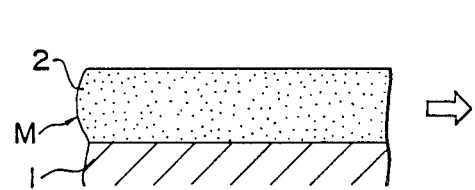
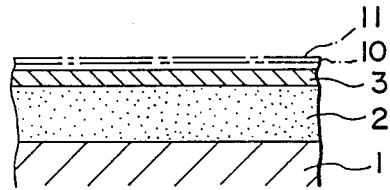
FIG. 2
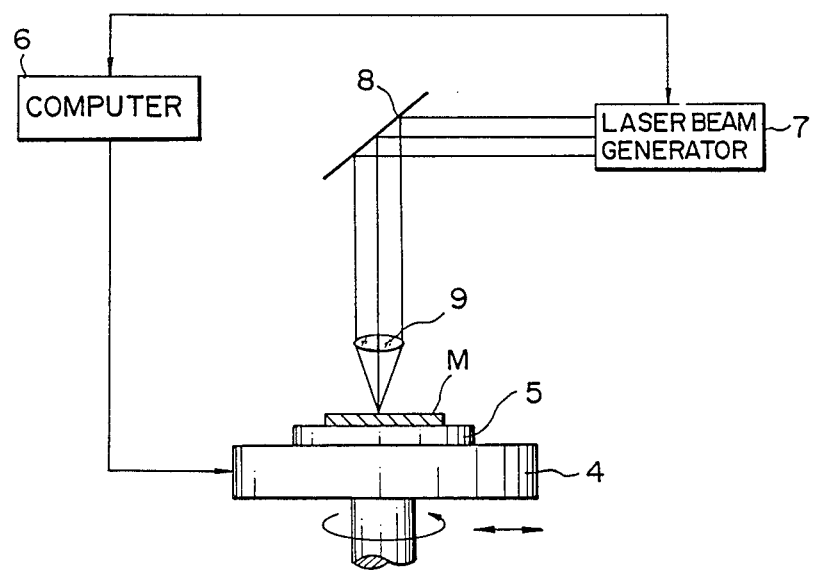

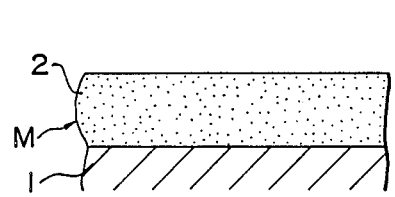
FIG. 1(a)
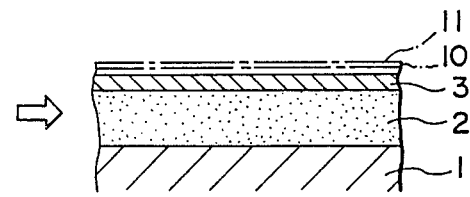
FIG. 1(b)
FIG. 2
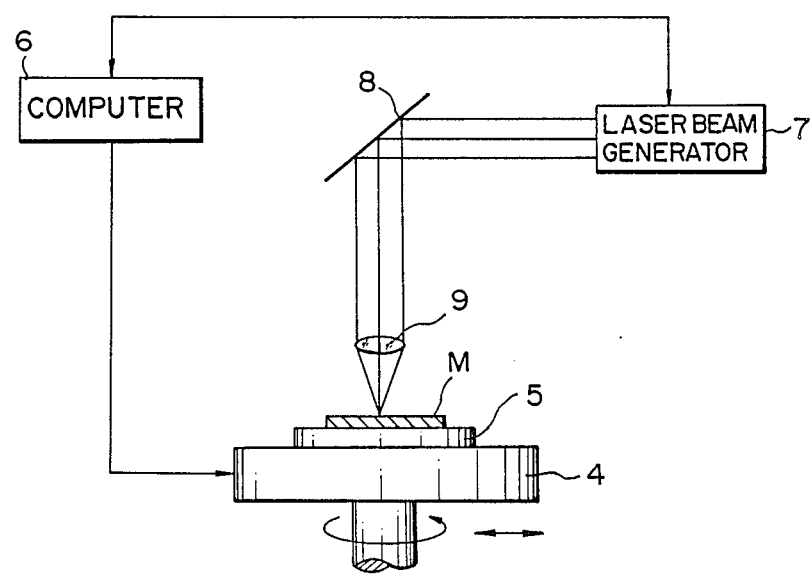

METHOD OF MANUFACTURING MAGNETIC RECORDING MEDIUM

BACKGROUND OF THE INVENTION

1. Field of the Invention

The present invention relates to a method of manufacturing a mangetic recording medium to be used as a cassette tape, a floppy disk, a hard disk, or the like.

2. Description of the Prior Art

FIG. 5 illustrates a structure of a conventional magnetic recording medium. In the drawing, a non-magnetic foundation layer b is formed on a surface of a substrate a. The substrate a is made of metal such as aluminum, or plastics. A magnetic layer c is formed on the foundation layer b. The upper surface of the magnetic layer c is coated with a protective layer d, and the upper surface of the protection layer d is coated with a lubrication layer e to improve slipping of a magnetic head thereon. In this case, to form the foundation layer b and the magnetic layer c, an electrolytic oxidation method, an electroplating method, an electroless plating method, a sputtering method, or the like, has been conventionally employed. By the way, it is required that the foundation layer b is provided with properties of being non-magnetic and having sufficiently high strength and hardness, and the magnetic layer c is provided with properties of being ferromagnetic and having superior corrosion-proof and friction-proof. Therefore, conventionally, a non-magnetic Ni-group material such as an alloy of Ni-P, Ni-Cu-P, or the like, has been used for the foundation layer b, and a magnetic Co-group material such as an alloy of Co-P, Co-Ni-P, or the like, has been used for the magnetic layer c. In other words, the respective alloys used for the foundation layer b and the magnetic layer c have been different in composition.

Thus, in the conventional method, there have been a problem that the process of formation of the foundation layer b and the magnetic layer c is complicated because those layers are different in alloy composition. Further, in a electrolyte method, an electrolytic oxidation method, etc., there has been a problem in management of electrolyte.

SUMMARY OF THE INVENTION

It is therefore an object of the present invention to solve the problems in the conventional magnetic recording medium manufacturing method.

It is another method of the present invention to provide a magnetic recording medium manufacturing method, in which the manufacturing process can be simplified.

In order to attain the above objects, the magnetic recording medium manufacturing method according to the present invention comprises the steps of forming a non-magnetic layer on a substrate by using a non-magnetic material which is magnetizable by heat to a predetermined temperature, and then locally heating the non-magnetic layer to magnetize the heated part to thereby form a magnetic layer thereat.

BRIEF DESCRIPTION OF THE DRAWINGS

Above and other objects, features and advantages of the present invention will appear more fully from the following description in conjunction with the accompanying drawings, in which:

FIG. 1 shows diagrams in section for explaining the steps in an embodiment of the magnetic recording medium manufacturing method according to the present invention;

FIG. 2 is a schematic diagram illustrating a manufacturing apparatus for executing the magnetic recording medium manufacturing method according to the present invention;

DETAILED DESCRIPTION OF THE PREFERRED EMBODIMENTS

Referring to FIGS. 1 through 4, embodiments of the present invention will be described hereunder.

FIG. 1 illustrates the steps in an embodiment of the magnetic recording medium manufacturing method according to the present invention. In this embodiment, a non-magnetic layer 2 is formed on a substrate 1 as shown in (a) in FIG. 1, and then only a surface layer region of the non-magnetic layer 2 is magnetized to thereby form a magnetic layer 3 as seen in (b) in FIG. 1. In this embodiment, an Ni-P alloy is used as a material for the non-magnetic layer 2 and the non-magnetic layer 2 is formed on the substrate 1 by an electroless plating method. Specifically, the substrate 1 of aluminum is dipped for a proper time into an electroless plating bath or a solution containing Ni ions and $H_2PO_2$ ions at proper concentration. In this case, the liquid composition of the electroless plating bath is controlled so that the content of P in the non-magnetic layer 2 becomes about 8% or more by weight. If the content of P in the non-magnetic layer 2 is selected to be such a value, the non-magnetic layer 2 can have a minute crystal structure (having a crystal grain size of 10–20 Å) which is nearly in an amorphous state and which can be magnetized when heated at a temperature of about 400° C. After the non-magnetic layer 2 has been formed on the surface of the substrate 1 in such a manner as described above, the surface of the non-magnetic layer 2 is subject to polishing, or the like, to be finished into a mirror surface. Thus, a material M in which the non-magnetic layer 2 is formed on the substrate 1 as shown in FIG. 1(a) is prepared.

Figure 3:
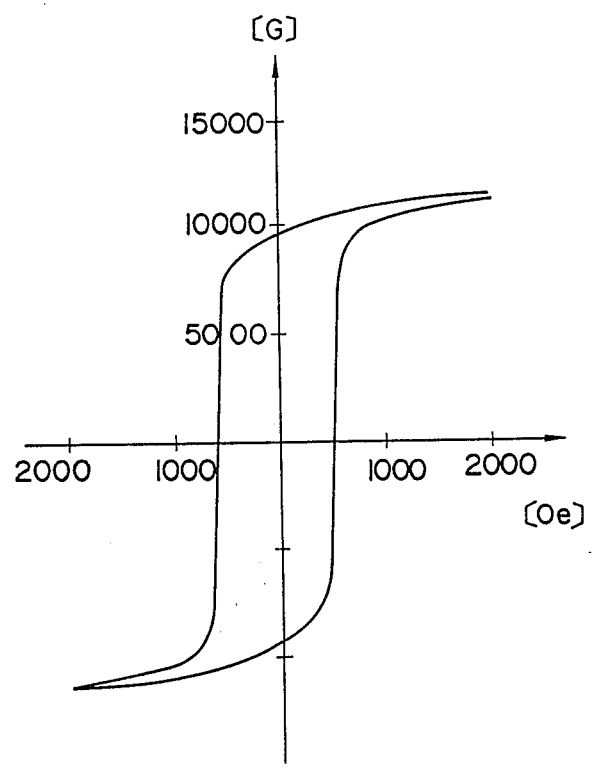
FIG. 3 is a diagram showing a magnetic field versus flux characteristic curve of a magnetic recording medium produced by the magnetic recording medium manufacturing method according to the present invention.

FIG. 2 show a magnetic layer forming apparatus for forming a magnetic layer (the magnetic layer 3 in FIG. 1(b)) in the non-magnetic layer 2 of the material M which has been prepared by the above-mentioned step (FIG. 1(a)). An outline of this apparatus will be now described. A table 4 is arranged in the apparatus so as to be rotatable as well as movable in the longitudinal and transversal directions. A cooling plate 5 is laid on the top surface of the table 4. The above-mentioned material M is set on the cooling plate 5. The rotation, the movement in the longitudinal and transversal directions, and the velocity therefor, of the table 4 is controlled by a computer 6. A laser beam generator 7 is arranged so that a laser beam emitted from the laser beam generator 7 in response to a command signal from the computer 6 is reflected by a reflection mirror 8 and then focused by a condenser 9 onto the surface of the non-magnetic layer 2 of the material M set on the cooling plate 5. Being not shown in the drawing, the apparatus is arranged so that the air inside the apparatus can be exchanged with an $N_2$ gas atmosphere. Thus, the material M is set within the apparatus, the laser beam is focused on the surface layer of the non-magnetic layer 2, and the surface layer of the non-magnetic layer 2 is irradiated with the laser beam in the $N_2$ gas atmosphere while moving the table 4 in the longitudinal or transverse direction. Thus, if only the surface layer of the non-magnetic layer 2 is heated to about 400° C., only the heated surface layer of the non-magnetic layer 2 is magnetized so that the magnetic layer 3 (FIG. 1(b)) is formed thereat. This magnetic layer 3 has a crystal structure in which two phases, that is, a face-centered cubic lattice type Ni and a tetragonal system $Ni_3P$, are separated from each other, so that the magnetic layer 3 is ferromagnetized so as to have coercive force. Thereafter, the protection layer 10 and the lubrication layer 11 are formed on the magnetic layer 3 in the same manner as in the conventional case. FIG. 3 show a magnetic field versus flux characteristic curve of a magnetic recording medium produced by the above-mentioned method. In the case where the content of P in the Ni-P alloy composition in the non-magnetic layer 2 Ni-P was selected to be about 11% by weight, and the thickness of the magnetic layer 3 was selected to be about 0.1 $\mu$m, the saturation magnetization was about 12,000 Gauss and the coercive force was about 500 Oersted. These numerical values of the saturation magnetization and the coercive force satisfy the characteristics required for a magnetic recording medium. Further, it has been confirmed that the magnetic recording medium having the magnetic layer 3 composed of an Ni-P alloy as described in this embodiment is excellent in corrosion proof as well as in abrasion resistance compared with the conventional magnetic layer of a Co-P alloy composition.

Figure 4A:
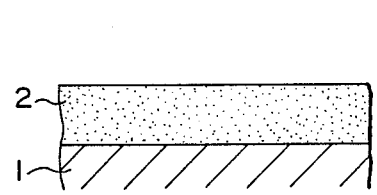
FIG. 4 shows diagrams in section for explaining the steps in another embodiment of the magnetic recording medium manufacturing method according to the present invention.
Figure 4A:
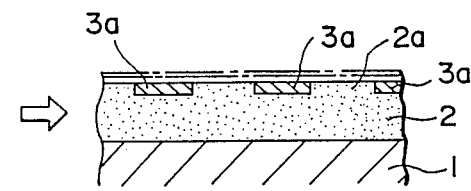
Figure 5:
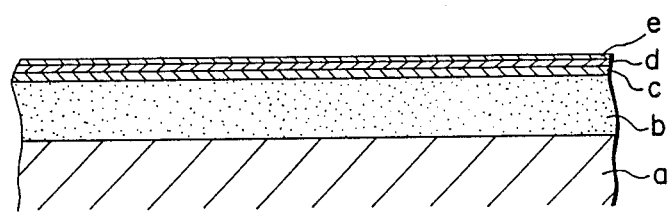
FIG. 5 is a diagram in section for explaining a structure of a conventionally generally known magnetic recording medium.

Although the embodiment illustrates the case where the magnetic layer 3 is formed in the whole surface layer of the non-magnetic layer 2, the present invention is not limited to this. For example, the surface layer of the non-magnetic layer 2 is partly heated so as to be partly magnetized so that non-magnetic layers 2a and magnetic layers 3a are alternately formed at regular intervals in the surface region over the lower non-magnetic layer 2 on a substrate 1 as shown in FIG. 4(b). Such a magnetic recording medium (FIG. 4(b)) can be obtained in such a manner as follows. In the above-mentioned apparatus shown in FIG. 2, the non-magnetic layer 2 of the material M mounted on the table 4 is irradiated with the laser beam from the laser beam generator 7 while rotating the table 4 so as to form a ring-like magnetic layer 3a in the surface layer of the non-magnetic layer 2. A plurality of such ring-like magnetic layers 3a are formed concentrically one after one, while concentrically leaving the non-magnetized portions as the non-magnetic layers 2a between the concentrically formed magnetic layers 3a. In the thus formed magnetic recording medium, the magnetic layers 3a are made to be data tracks, while the non-magnetic layers 2a are made to be non-data tracks, so that there occurs no such a defect that the reproduced output level is changed or a noise is picked up due to displacement (off-track) of a reading position in reproducing operation, and that the overwriting characteristic and the residual noise characteristic can be improved in erasing operation.

As described above as to the embodiments, according to the present invention, a magnetic layer is formed by locally heating a non-magnetic layer formed on a substrate. Accordingly, there is no such inconvenience that the alloy composition used in the foundation layer must be changed from that used in the magnetic layer, unlike the conventional method. Therefore, the management for the alloy composition as well as for the electrolyte becomes easy and the production process is substantially simplified. If a magnetic layer of Ni-P alloy composition is formed, as described in the embodiment, not only corrosion-proof as well as abrasion resistance are improve compared with a magnetic layer of a conventional Co-P alloy composition, but also the economical advantage is remarkable because expensive cobalt material is not used.

What is claimed is:

1. A method of manufacturing a magnetic recording medium comprising the steps of:
   forming a non-magnetic layer on a substrate by using a non-magnetic material made of amorphous Ni-P alloy which is magnetizable by heat at a predetermined temperature, and then locally heating with a laser beam in an inert gas atmosphere said nonmagnetic layer to magnetize the heated part to thereby locally form a magnetic layer made of crystalline Ni-P alloy thereat.

2. The magnetic recording medium manufacturing method according to claim 1, in which said non-magnetic layer is heated at its surface layer so that the whole surface layer of said nonmagnetic layer is magnetized so as to form said magnetic layer in the whole surface layer of said non-magnetic layer.

3. The magnetic recording medium manufacturing method according to claim 1, in which said non-magnetic layer is heated partly at its surface layer so that the surface layer of said non-magnetic layer is magnetized at its concentrically separated ring-like portions so so as to form a plurality of concentrically separated ring-like portions of said magnetic layer in the surface layer of said non-magnetic layer.

4. The magnetic recording medium manufacturing method according to claim 1, in which said non-magnetic layer is formed with an Ni-P alloy on said substrate through an electroless plating method.

5. The magnetic recording medium manufacturing method according to claim 1, in which the step of forming said non-magnetic layer on said substrate includes a step of dipping a substrate of aluminum into an electroless plating bath containing Ni ions and $H_2PO_2$ ions.

6. The magnetic recording medium manufacturing method according to claim 5, in which said electroless plating bath is selected so as to have a liquid composition that makes the content of P in said non-magnetic layer becomes not less than about 8% by weight.

* * * * *